(12) United States Patent
Lee

(10) Patent No.: US 9,281,694 B2
(45) Date of Patent: Mar. 8, 2016

(54) ELECTRONIC DEVICE AND WIRELESS POWER RECEIVER EQUIPPED IN THE SAME

(71) Applicant: LG INNOTEK CO., LTD., Seoul (KR)

(72) Inventor: Jung Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 605 days.

(21) Appl. No.: 13/653,755

(22) Filed: Oct. 17, 2012

(65) Prior Publication Data

US 2013/0093258 A1 Apr. 18, 2013

(30) Foreign Application Priority Data

Oct. 18, 2011 (KR) .................. 10-2011-0106367

(51) Int. Cl.
| | |
|---|---|
| *H01F 38/14* | (2006.01) |
| *H02J 5/00* | (2006.01) |
| *H02J 7/02* | (2006.01) |

(52) U.S. Cl.
CPC .... *H02J 5/005* (2013.01); *H02J 7/025* (2013.01)

(58) Field of Classification Search
CPC ............ H01F 38/14; H02J 5/005; H02J 7/025
USPC ........................................................ 307/104
See application file for complete search history.

(56) References Cited

U.S. PATENT DOCUMENTS

| | | | | |
|---|---|---|---|---|
| 2009/0243601 | A1* | 10/2009 | Feldtkeller | ......... H03K 17/9505 |
| | | | | 324/207.26 |
| 2011/0175457 | A1 | 7/2011 | Komiyama | |
| 2011/0181123 | A1* | 7/2011 | Ichikawa | ...................... 307/104 |
| 2013/0147470 | A1* | 6/2013 | Mulholland | ........... G01D 5/204 |
| | | | | 324/225 |

FOREIGN PATENT DOCUMENTS

| | | |
|---|---|---|
| CN | 10-2177637 A | 9/2011 |
| EP | 2348609 A2 | 7/2011 |

OTHER PUBLICATIONS

Office Action dated May 28, 2014 in Chinese Application No. 201210397492.3.

* cited by examiner

*Primary Examiner* — Rexford Barnie
*Assistant Examiner* — Terrence Willoughby
(74) *Attorney, Agent, or Firm* — Saliwanchik, Lloyd & Eisenchenk

(57) ABSTRACT

A wireless power receiver for receiving power from a wireless power transmitter using resonance according to the embodiment includes a reception resonant coil resonance-coupled with a transmission resonant coil of the wireless power transmitter for receiving the power, a reception induction coil coupled with the reception resonant coil for receiving the power, and a connecting unit, and the reception resonant coil includes at least one conductive line having one end and an opposite end being open with each other, and the connecting unit couples the one end and the opposite end of each conductive line with each other so that the reception resonant coil forms a closed loop.

13 Claims, 5 Drawing Sheets

ELECTRONIC DEVICE AND WIRELESS POWER RECEIVER EQUIPPED IN THE SAME

CROSS-REFERENCE TO RELATED APPLICATION

This application claims the benefit under 35 U.S.C. §119 of Korean Patent Application No. 10-2011-0106367, filed Oct. 18, 2011, which is hereby incorporated by reference in its entirety.

BACKGROUND

The disclosure relates to an electronic device and a wireless power receiver equipped in the same. More particularly, the embodiment relates to a wireless power transmission incorporated with various types of electronic devices capable of receiving power in a wireless scheme to receive power from a transmission side using resonance.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme using resonance has been widely used.

Since an electric signal generated between the wireless power transmitter and the wireless power receiver is wirelessly transferred through coils in a wireless power transmitting system using resonance, a user may easily charge electronic appliances such as a portable device.

However, because a shape of the electronic device is restricted and the size of the electronic device is small, the size of the coil also becomes small and a coil arrangement mounted inside the electronic device is not easy so that efficiency of power transmission is lowered.

BRIEF SUMMARY

The embodiment provides an electronic device and a wireless power receiver equipped in the same to improve power transmission efficiency by arranging a receiving coil according to a type of the electronic device.

The embodiment provides an electronic device and a wireless power receiver capable of increasing power transmission efficiency regardless of a location of the electronic device by arranging a receiving coil according to a type of the electronic device.

According to the embodiment, there is provided a wireless power receiver for receiving power from a wireless power transmitter using resonance, including: a reception resonant coil resonance-coupled with a transmission resonant coil of the wireless power transmitter for receiving the power; a reception induction coil coupled with the reception resonant coil for receiving the power; and a connecting unit, wherein the reception resonant coil includes at least one conductive line having one end and an opposite end being open with each other, and the connecting unit couples the one end and the opposite end of each conductive line with each other so that the reception resonant coil forms a closed loop.

An electronic device may be equipped in the wireless power receiver.

The electronic device may include one of a headset, an earphone, and 3-D glasses.

According to the embodiment, the coil arrangement can be optimized in a limited space inside the wireless power receiver. Since the coil serves as a charging switch, convenience of a user can be improved. During the charging operation, a radius of the coil is increased so that the degree of freedom and a power transmission distance can be improved, and accordingly, power transmission efficiency can be maximized.

DETAILED DESCRIPTION

Hereinafter, an exemplary embodiment of the disclosure will be described with reference to accompanying drawings so that those skilled in the art can easily comprehend the disclosure.

Figure 1:
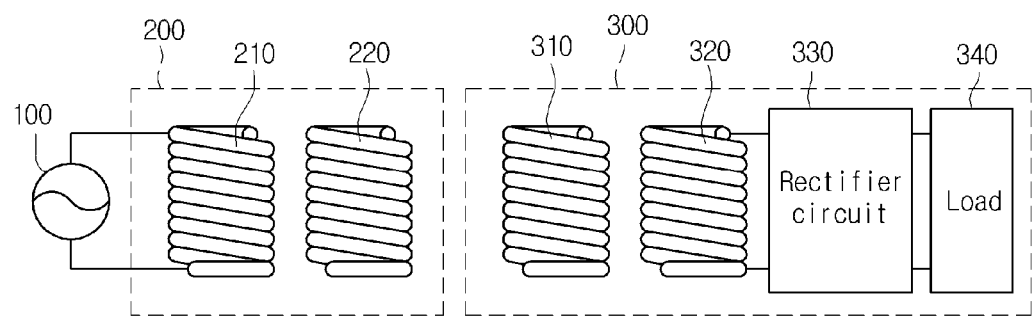
FIG. 1 is a diagram illustrating a wireless power transmission system according to an embodiment.

FIG. 1 is a diagram illustrating a wireless power transmission system according to an embodiment.

The power generated from a power source 100 is provided to a wireless power transmitter 200, such that the wireless power transmitter 200 transmits the power using resonance to the wireless power receiver 300, which is resonant with the wireless power transmitter 200 and has the same resonant frequency value as that of the wireless power transmitter 200.

In detail, the power source 100 is an alternating current (AC) power source for supplying AC power of a predetermined frequency.

The wireless power transmitter 200 includes a transmission induction coil 210 and a transmission resonant coil 220. The transmission induction coil 210 is connected to the power source 100, such that an AC current flows through the transmission induction coil 210. When an AC current flows through the transmission induction coil 210, an AC current is induced to the transmission resonant coil 220 physically spaced apart from the transmission induction coil 210 due to electromagnetic induction. The power transferred to the transmission resonant coil 220 is transmitted using resonance to the wireless power receiver 300 which forms a resonance circuit with the wireless power transmitter 200.

According to the power transmission using resonance, the power can be transmitted between two LC circuits which are impedance-matched with each other. The power transmission scheme using the resonance can transmit the power farther than the power transmission scheme using the electromagnetic induction with the higher power transmission efficiency.

The wireless power receiver 300 includes a reception resonant coil 310, a reception induction coil 320, a rectifier circuit 330, and a load 340. The power transmitted from the transmission resonant coil 220 is received at the reception resonant coil 310, so that the AC current flows through the reception resonant coil 310. The power transmitted to the reception resonant coil 310 is transferred by electromagnetic induction to the reception induction coil 320. The power transferred to the reception induction coil 320 is transferred through the rectifier circuit 330 to the load 340.

Figure 2:
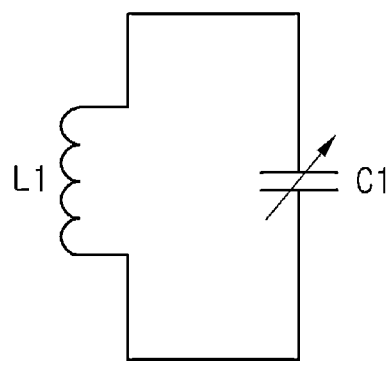
FIG. 2 is a circuit diagram showing an equivalent circuit of a transmission induction coil according to an embodiment.

FIG. 2 is a circuit diagram showing an equivalent circuit of a transmission induction coil 210 according to an embodiment. As shown in FIG. 2, the transmission induction coil 210 may include an inductor L1 and a capacitor C1, and form a circuit having inductance value and suitable capacitance. The capacitor C1 may be a variable capacitor. The wireless power transmitter 200 may control the variable capacitor for an impedance matching. Meanwhile, equivalent circuits of the transmission resonant coil 220, the reception resonant coil 310, and the reception induction coil 320 may be equal to that depicted in FIG. 2.

Figure 3:
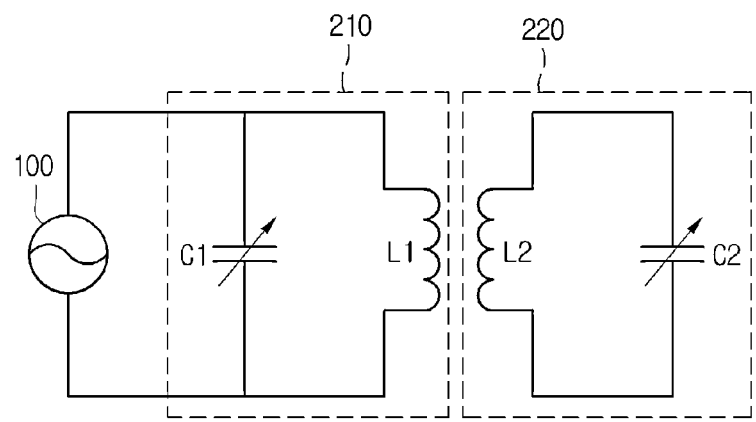
FIG. 3 is a circuit diagram showing an equivalent circuit of a power source and a wireless power transmitter according to an embodiment.

FIG. 3 is a circuit diagram showing an equivalent circuit of a power source 100 and a wireless power transmitter 200 according to an embodiment. As shown in FIG. 3, each of the transmission induction coil 210 and the transmission resonance coil 220 may include an inductor L1 or L2 and a capacitor C1 or C2 having predetermined inductance and predetermined capacitance, respectively.

Figure 4:
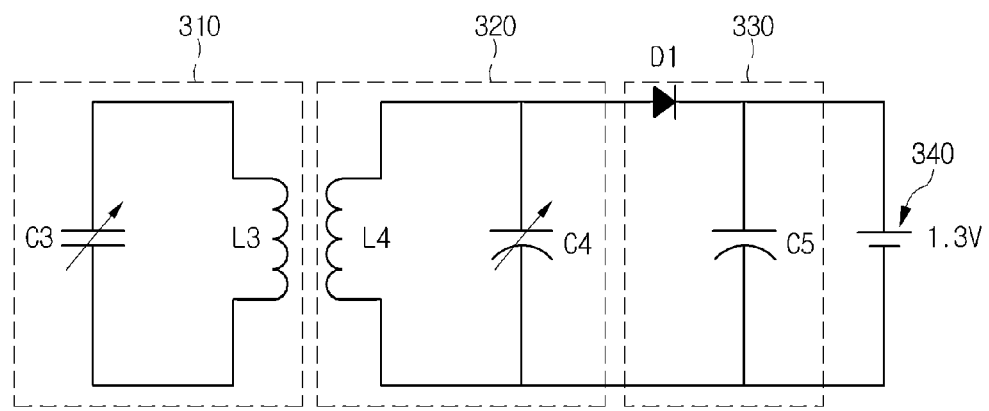
FIG. 4 is a circuit diagram showing an equivalent circuit of a reception resonant coil, a reception induction coil, a rectifier circuit, and a load according to an embodiment.

FIG. 4 is a circuit diagram showing an equivalent circuit of a reception resonant coil 310, a reception induction coil 320, a rectifier circuit 330, and a load 340 according to an embodiment.

As shown in FIG. 4, the transmission resonant coil 310 and the reception coil 320 may include an inductor L3 or L4 and a capacitor C3 or C4 having predetermined inductance and predetermined capacitance, respectively. The rectifier circuit 330 may include a diode D1 and a rectifying capacitor C5 such that the rectifier circuit 330 converts AC power into direct current (DC) power and outputs the DC power. Although the load 340 is denoted as a 1.3 V DC power source, the load 340 may be a battery or other devices requiring DC power.

Figure 5:
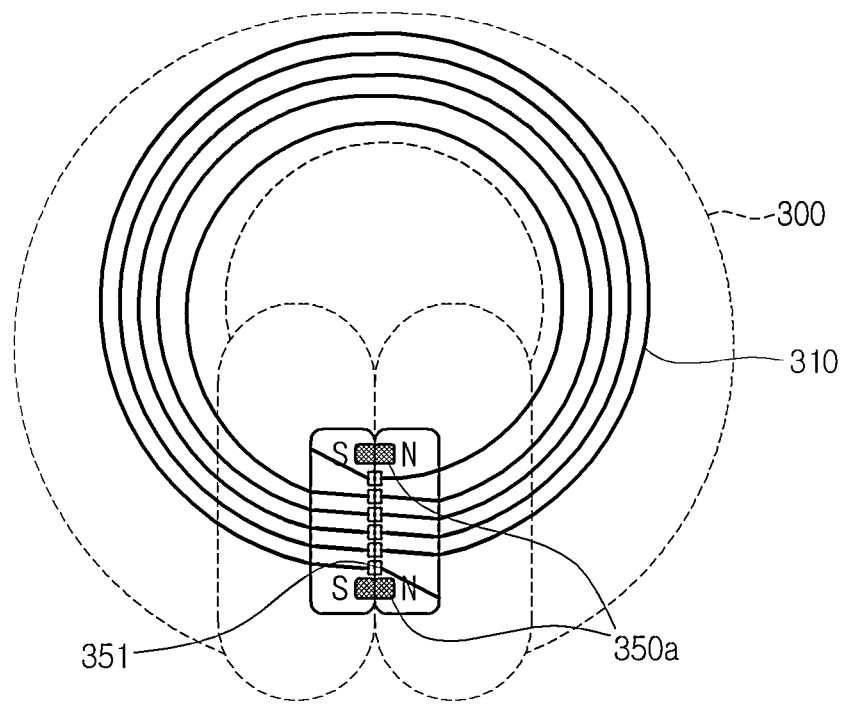
FIG. 5 is a diagram illustrating an example of a configuration of a wireless power receiver according to an embodiment.

FIG. 5 is a diagram illustrating an example of a configuration of a wireless power receiver according to an embodiment.

Particularly, FIG. 5 illustrates a state that at least one conductive line constituting the reception resonant coil 310 is connected to each other through the permanent magnet 350a when a connecting unit 350 is a permanent magnet 350a.

In FIG. 5, the wireless power receiver 300 is equipped in a headset by way of an example. The wireless power receiver 300 may be equipped in an electronic device capable of receiving power in a wireless scheme, and the electronic device may include 3-D glasses, an earphone, and a headset. However, the embodiment is not limited to the above.

The reception resonant coil 310 may be configured by at least one conductive line. When the wireless power receiver 300 does not receive power from the wireless power transmitter 200, that is, when the wireless power receiver 300 is not charged, one end and an opposite end of the at least one conductive line constituting the reception resonant coil 310 may be in an open state, representing that the user may not use the wireless power receiver 300.

When the user wishes to charge the wireless power receiver 300, the permanent magnet 350a may couple the conductive lines, which are open with each other and constitute the reception resonant coil 310, with each other. That is, the conductive lines constituting the reception resonant coil 310 may be connected with each other by a magnetic force of the permanent magnet 350a. Owing to this, the reception resonant coil 310 may form one closed loop. Accordingly, the reception resonant coil 310 may be subject to the condition capable of receiving power using resonance from the wireless power transmitter 200.

When the reception resonant coil 310 is connected through one conductive line to form one closed loop, the reception resonant coil 310 may receive power by resonance-coupling with the transmission resonant coil 220 of the wireless power transmitter 200. That is, the transmission resonant coil 220 and the reception resonant coil 310 are resonance-coupled with each other to operate at a resonant frequency.

The wireless power receiver 300 may further include an auxiliary connecting unit 351 supporting coupling of the conductive lines which are open with each other. The auxiliary connecting unit 351 may be configured in the form of a jack or a pad as a means for supporting the coupling of the conductive lines. However, the embodiment is not limited to the above.

The auxiliary connecting unit 351 may more firmly ensure the coupling of the conductive lines which are open with each other. The auxiliary connecting unit 351 may tightly maintain coupling of the conductive lines by the permanent magnet 350a.

As described above, when the reception resonant coil 310 is connected through one conductive line to form one closed loop, a radius of the reception resonant coil 310 is increased. If the radius of the reception resonant coil 310 is increased, a magnetic field is widely formed in the reception resonant coil 310. Accordingly, when the wireless power receiver 300 receives power, the degree of freedom of the wireless power receiver 300 may be increased. Further, a transmission distance of wireless power can be increased and power efficiency can be improved.

A coil arrangement can be optimized in a limited space inside the wireless power receiver 300 according to coupling states of the conductive lines constituting the reception resonant coil 310. The reception resonant coil 310 serves as a charging switch to increase convenience for a user.

That is, since the user may not be required to put an electronic device, such as a headset equipped with the wireless power receiver 300, directly on the wireless power transmitter 200, the headset may be stably charged.

Figure 6:
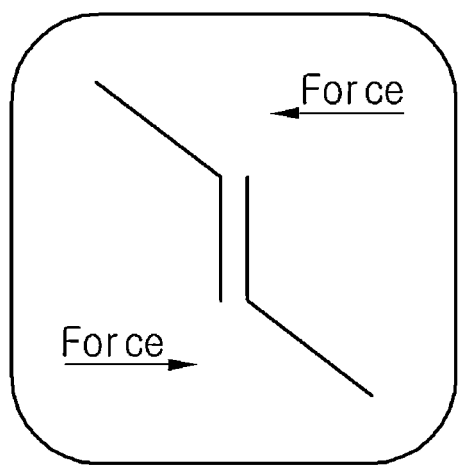
FIG. 6 is a diagram illustrating a coupling principle of a reception resonant coil using a permanent magnet according to an embodiment.

FIG. 6 is a diagram illustrating a coupling principle of a reception resonant coil using a permanent magnet according to an embodiment.

The permanent magnet 35a is a magnet which generates and maintains a stable magnetic field without receiving electric energy from the outside. It is preferable that a material of the permanent magnet includes a material having large residual magnetism (several thousand to ten thousand G) and a great coercive, force other than a material representing high permeability. The material of the permanent magnet may be classified into tungsten steel, chrome steel, and KS steel as hardening magnet manufactured by quenching according to a manufacturing method.

A precipitation hardening type magnet may use steel alnico (alloy of aluminum•nickel•cobalt•copper), KS steel•cunife (alloy of copper•nickel•iron).

An arrow of FIG. 6 refers to a direction in which a force is applied by a permanent magnet.

The force signifies the magnetic force and the magnetic force is applied in the arrow direction so that one end and an opposite end of at least one open conductive line of the reception resonant coil 310 are connected with each other. If the opposite end of each conductive line is connected with the one end of each conductive line, the charge operation is possible.

Figure 7:
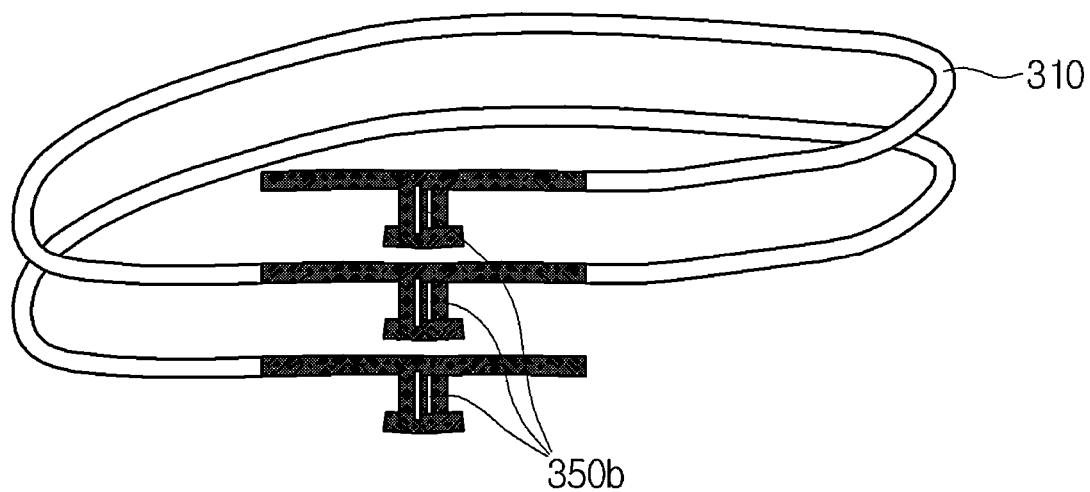
FIG. 7 is a diagram illustrating an example of a configuration of a reception resonant coil according to an embodiment.

FIG. 7 is a diagram illustrating an example of a configuration of a reception resonant coil according to an embodiment.

FIG. 7 illustrates a state that at least one conductive line constituting the reception resonant coil 310 is connected to each other through an elastic member 350b, particularly, when a connecting unit 350 is the elastic member 350b.

The reception resonant coil 310 may be configured by at least one conductive line. When the wireless power receiver 300 does not receive power from the wireless power transmitter 200, that is, when the wireless power receiver 300 is not charged, one end and an opposite end of the at least one conductive line constituting the reception resonant coil 310 may be in an open state, representing that the user may not use the wireless power receiver 300.

When the user wishes to charge the wireless power receiver 300, the elastic magnet 350b may couple the conductive lines, which are open with each other and constitute the reception resonant coil 310, with each other. That is, the conductive lines constituting the reception resonant coil 310 may be connected with each other by the elastic member 350b so the reception resonant coil 310 forms one closed loop. In detail, referring to FIG. 7, one end and an opposite end of each conductive line constituting the reception resonant coil 310 are connected with each other, and one end and an opposite end of the reception resonant coil 310 are connected with each other, so that the reception resonant coil 310 may form one closed loop. Accordingly, the reception resonant coil 310 is subject to the condition capable of receiving power using resonance from the wireless power transmitter 200.

When the reception resonant coil 310 is connected through one conductive line to form one closed loop, the reception resonant coil 310 may receive power by resonance-coupling with the transmission resonant coil 220 of the wireless power transmitter 200.

As described above, when the reception resonant coil 310 is connected through one conductive line to form one closed loop, a radius of the reception resonant coil 310 is increased. If the radius of the reception resonant coil 310 is increased, a wide magnetic field is formed in the reception resonant coil 310. Accordingly, when the wireless power receiver 300 receives power, the degree of freedom of the wireless power receiver 300 may be increased. Further, a transmission distance of wireless power can be increased and power efficiency can be improved.

Figure 8:
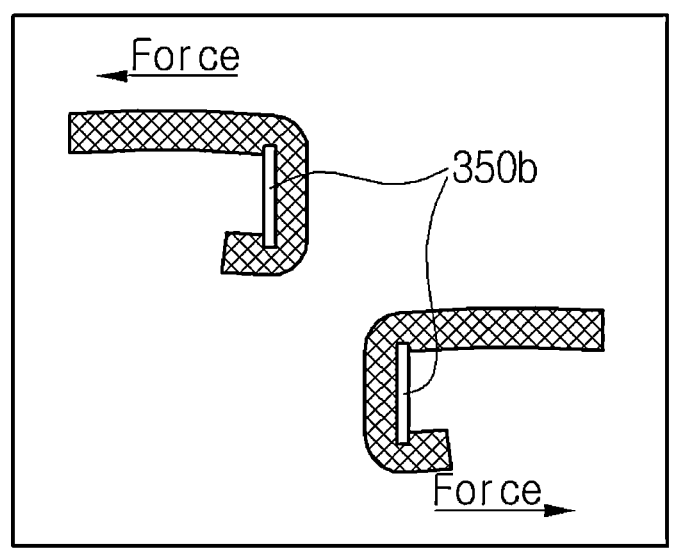
FIG. 8 is a diagram illustrating a coupling principle of a reception resonant coil using an elastic member according to an embodiment.

FIG. 8 is a diagram illustrating a coupling principle of a reception resonant coil using an elastic member according to an embodiment.

A material of the elastic member 350b is not specially limited if the material has a predetermined elasticity capable of connecting one end with the opposite end of the conductive line. For example, the material of the elastic member 350b may include a polymer resin and a resin composite.

Referring to FIG. 8, an arrow refers to a direction of a force applied to couple a conductive line constituting the reception resonant coil 310. If the force is applied in an arrow direction, one end and an opposite end of each conductive line are connected with each other by the elastic member 350b so that one conductive line is formed. That is, the charge operation is possible.

Figure 9:
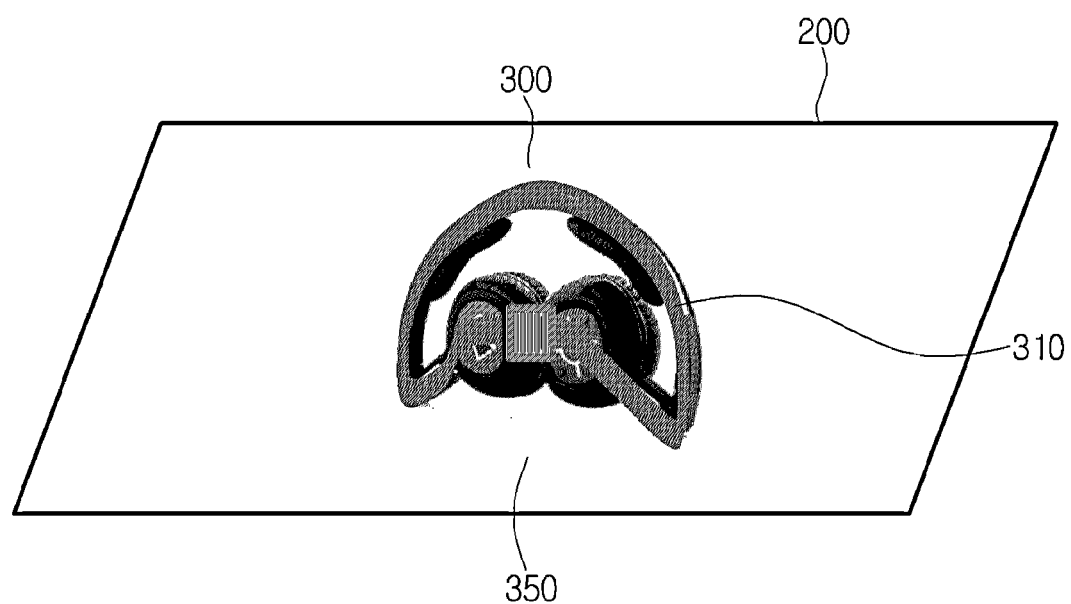
FIG. 9 is a diagram illustrating an example of a configuration of a wireless power transmission system according to an embodiment.

FIG. 9 is a diagram illustrating an example of a configuration of a wireless power transmission system according to an embodiment.

Particularly, FIG. 9 illustrates a state that at least one conductive line constituting the reception resonant coil 310 is connected to each other through the connecting unit 350.

The wireless power transmission system may include a wireless power transmitter 200 and the wireless power receiver 300.

The wireless power transmitter 200 may be configured in the form of a pad.

The wireless power transmitter 200 configured in the form of the pad transmits power to the wireless power receiver 300. However, as shown in FIG. 9, only when one end and an opposite end of each conductive line constituting the reception resonant coil 310 of the wireless power receiver 300 are connected to each other by the connecting unit 350, the wireless power receiver 300 may be in a chargeable state. If the user does not wish to charge the electronic device or the charging operation is completed, connection of one end and an opposite end of each conductive line constituting the reception resonant coil 310 may be released.

When the one end and the opposite end of each conductive line constituting the reception resonant coil 310 of the wireless power receiver 300 are connected to each other by the connecting unit 350, a radius of the reception resonant coil 310 may be increased.

In a case where the radius of the reception resonant coil 310 is increased, when the wireless power receiver 300 receives power from the wireless power transmitter 200, a freedom degree of the wireless power receiver 300 may be increased. Further, a transmission distance of wireless power can be increased and power efficiency can be improved.

A coil arrangement can be optimized in a limited space inside the wireless power receiver 300 according to coupling states of respective conductive lines constituting the reception resonant coil 310. The reception resonant coil 310 serves as a charging switch to increase convenience for a user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be apparent to those skilled in the art that various modifications and variations can be made in the present invention. Thus, it is intended that the present invention covers the modifications and variations of this invention provided they come within the scope of the appended claims and their equivalents.

Therefore, the embodiments and the configurations depicted in the drawings are illustrative purposes only and do not represent all technical scopes of the embodiments, so it should be understood that various equivalents and modifications may exist at the time of filing this application.

What is claimed is:

1. A portable device for receiving power from a wireless power transmitter using resonance, the portable device comprising:
   a reception resonant coil resonance-coupled with a transmission resonant coil of the wireless power transmitter for receiving the power, the reception resonant coil including a conductive line, wherein the conductive line has a first end and a second end being open to each other; and
   a connecting unit including a first connector and a second connector,
   wherein both ends of the conductive line are disposed in the connecting unit,
   wherein the first end of the conductive line is disposed in the first connector and the second end of the conductive line is disposed in the second connector, the first and second connectors being connectable to each other so that the reception resonant coil forms a closed loop.

2. The portable device of claim 1, wherein the first and second connectors are connected using an auxiliary connecting unit for a connection of the conductive line, and
   wherein the auxiliary connecting unit maintains the connection of the conductive line.

3. The portable device of claim 2, wherein the conductive line includes n conductive lines, n being an integer equal to or greater than 2; wherein each of the n conductive lines has its own first and second ends and wherein the first end of a first conductive line and a second end of a second conductive line are connectable to each other so that the reception resonant coil forms a closed loop.

4. The portable device of claim 2, wherein the auxiliary connecting unit includes a first auxiliary connector and a second auxiliary connector, and
   wherein each of the first and second auxiliary connectors comprises a permanent magnet having different polarities.

5. The portable device of claim 1, wherein the connecting unit comprises an elastic member.

6. The portable device of claim 5, wherein the elastic member comprises a polymer resin or a resin composite.

7. The portable device of claim 1, wherein the reception resonant coil comprises an inductor and a capacitor.

8. The portable device of claim 7, wherein the capacitor includes a variable capacitor for matching resonant frequency with the transmission resonant coil.

9. The portable device of claim 1, further comprising
   a reception induction coil coupled with the reception resonant coil for receiving the power,
   wherein the reception induction coil comprises an inductor and a capacitor.

10. The portable device of claim 1, further comprising a rectifier circuit converting AC power received from the reception induction coil into DC power and transferring the DC power to a load.

11. The portable device of claim 1, wherein a radius of the reception resonant coil is greater than a radius of the transmission resonant coil.

12. The portable device of claim 1, wherein the first and second connectors include a first output line and a second output line, respectively; and
    wherein the first end of the conductive line is connected to one of the first and second output lines and the second end of the conductive line is connected to the other of the first and second output lines.

13. The portable device of claim 3, wherein the first and second connectors include a first output line and a second output line, respectively; and
    wherein the second end of the first conductive line is connected to one of the first and second output lines and the first end of a n-th conductive line is connected to the other of the first and second output lines.

* * * * *